United States Patent [19]

Miller

[11] Patent Number: 5,992,556
[45] Date of Patent: Nov. 30, 1999

[54] METHOD AND APPARATUS FOR DAMPING CONTROL OF AN ELECTRIC ASSIST STEERING SYSTEM WITH VEHICLE SPEED SIGNAL LOSS FEATURE

[75] Inventor: Joseph Daryl Miller, Farmington Hills, Mich.

[73] Assignee: TRW Inc., Lyndhurst, Ohio

[21] Appl. No.: 08/843,416

[22] Filed: Apr. 15, 1997

[51] Int. Cl.[6] .............................. B62D 5/04; G06F 7/70
[52] U.S. Cl. .................................. 180/446; 364/424.051
[58] Field of Search ............................... 180/443, 444, 180/446; 364/424.051, 424.052

[56] References Cited

U.S. PATENT DOCUMENTS

| | | |
|---|---|---|
| 3,983,953 | 10/1976 | Bayle . |
| 4,415,054 | 11/1983 | Drutchas . |
| 4,554,607 | 11/1985 | Mora ......................................... 361/104 |
| 4,660,671 | 4/1987 | Behr et al. . |
| 4,869,334 | 9/1989 | Marumoto et al. . |
| 4,909,343 | 3/1990 | Mouri et al. . |
| 5,097,420 | 3/1992 | Morishita . |
| 5,257,828 | 11/1993 | Miller et al. . |
| 5,339,243 | 8/1994 | Matsuoka et al. . |
| 5,442,956 | 8/1995 | Persson . |
| 5,473,231 | 12/1995 | McLaughlin et al. ................. 180/79.1 |
| 5,504,403 | 4/1996 | McLaughlin . |
| 5,528,497 | 6/1996 | Yamamoto et al. . |
| 5,568,389 | 10/1996 | McLaughlin et al. . |
| 5,623,409 | 4/1997 | Miller ..................................... 180/443 |
| 5,709,281 | 1/1998 | Sherwin et al. ........................ 180/272 |
| 5,743,351 | 4/1998 | McLauglin et al. .................... 180/446 |
| 5,828,972 | 10/1998 | Asanuma et al. ....................... 180/446 |

FOREIGN PATENT DOCUMENTS

| | | |
|---|---|---|
| 692254 | 4/1994 | Japan . |
| 710013 | 1/1995 | Japan . |
| 8207812 | 8/1996 | Japan . |

OTHER PUBLICATIONS

U.S. Patent Appln. Serial No. 08/329,206, filed Oct. 26, 1994, to Persson, et al., assigned to TRW Inc.
U.S. Patent Appln. Serial No. 08/331962, filed Oct. 31, 1994, to Joseph D. Miller, assigned to TRW Inc.
U.S. Patent Appln. Serial No. 08/710,742, filed Sep. 20, 1996, to Beck.

*Primary Examiner*—Lanna Mai
*Assistant Examiner*—Jeff Restifo
*Attorney, Agent, or Firm*—Tarolli, Sundheim, Covell, Tummino & Szabo LLP

[57] ABSTRACT

An electric assist steering system includes a vehicle speed sensor that provides a vehicle speed signal. A determination is made as to whether loss of the vehicle speed signal has occurred. Damping of the electric assist steering system is controlled in response to the sensed vehicle speed and in response to a predetermined vehicle speed value when the vehicle speed signal is lost.

12 Claims, 2 Drawing Sheets

5,992,556

METHOD AND APPARATUS FOR DAMPING CONTROL OF AN ELECTRIC ASSIST STEERING SYSTEM WITH VEHICLE SPEED SIGNAL LOSS FEATURE

TECHNICAL FIELD

The present invention is directed to an electric assist steering system and is particularly directed to a method and apparatus for detecting a vehicle speed signal loss in an electric assist steering system and for damping control of an electric assist steering system when a vehicle speed signal loss occurs.

BACKGROUND OF THE INVENTION

There are many known power assist steering systems for automotive vehicles. Some provide steering assist by using hydraulic power and others by using electric power.

Electric power assist steering systems that utilize a rack and pinion gear set provide power assist by using an electric motor to either (i) apply rotary force to a steering input shaft connected to a pinion gear, or (ii) apply linear force to a steering member having the rack teeth thereon. The electric motor in such systems is typically controlled in response to (i) a driver's applied steering torque to the vehicle steering wheel, and (ii) sensed vehicle speed.

In U.S. Pat. No. 3,983,953, an electric motor is coupled to the input steering shaft and energized in response to the torque applied to the steering wheel by the vehicle operator. An electronic control system includes a torque sensor and uses the output of a vehicle speed sensor. A computer receives the output signals provided by both sensors. The computer controls the amount of the assistance provided by the motor in response to the applied steering torque and the sensed vehicle speed.

U.S. Pat. No. 4,415,054 (now U.S. Reissue Patent No. 32,222, (hereinafter, "the Drutchas steering gear") utilizes a D.C. electric assist motor driven through an H-bridge arrangement. The motor encircles a steering member. The steering member has a thread convolution portion and a portion having straight cut rack teeth thereon. Energization of the electric assist motor causes linear movement of the steering member through a ball-nut drive arrangement driven by the motor in combination with the thread convolution portion of the steering member. A torque sensing device is coupled to the steering column to sense driver applied steering input torque to the steering wheel. The torque sensing device uses a magnet Hall-effect sensor arrangement for sensing relative rotation between the input and pinion shafts across a torsion bar. An electronic control unit monitors the signal from the torque sensing device and controls the electric assist motor in response thereto.

U.S. Pat. No. 4,660,671 disclosed an electric controlled steering system that is based on the Drutchas steering gear. In accordance with the '671 patent, a D.C. motor is axially spaced from the ball-nut and is operatively connected thereto through a connection tube. The electronic control unit includes a plurality of diagnostic features that monitor the operation of the steering system. If an error in the operation of the electric steering system is detected, the electric assist system is disabled and steering reverts to an unassisted mode.

Hydraulic power assist steering systems have an inherent yaw damping characteristic that is effective during a steering maneuver. A yaw damping characteristic in a power assist steering system is particularly important when the vehicle is traveling at a relatively high speed. It is, therefore, desirable to provide such a yaw damping characteristic in an electric assist steering system that would, at least, simulate that provided by a hydraulic power assist steering system and, preferably, improve thereupon.

A known prior art electric assist steering system provided damping by switching a load resistor across the electric assist motor when the vehicle speed exceeded a predetermined value. When the vehicle speed was below the predetermined value or when applied steering torque exceeded a predetermined amount, the resistor was disconnected from across the motor. This method of damping was used to control the yaw rate of the vehicle when the road wheels returned after a turn.

U.S. Pat. No. 5,257,828 to Miller et al., disclosed a method and apparatus for controlling damping in an electric assist steering system for vehicle yaw rate control. A control circuit modifies a motor control signal in response to a sensed motor speed and sensed vehicle speed signal so as to provide damping that is functionally related to both the motor speed and the vehicle speed for vehicle yaw rate control.

U.S. patent application Ser. No. 08/331,962, filed Oct. 31, 1994 to Miller disclosed a yaw rate damping arrangement for an electric assist steering system in which a non-linear damping characteristic is provided in response to the sensed rotational rate of the electric assist motor. The damping characteristic is adjusted in response to the sensed vehicle speed so that damping increases as sensed vehicle speed increases. Specifically, an electric assist steering system includes a torque sensor means for sensing applied steering torque and providing a torque signal having a value indicative of the applied steering torque. Means provides a torque demand signal having a value functionally related to the applied steering torque. An electric assist variable reluctance motor is operatively connected to a steering member for, when energized, providing steering assist. The variable reluctance motor has a rotor and a stator. Rotor position relative to the stator is sensed and motor speed is derived therefrom. A motor control signal is provided in response to torque demand signal. Vehicle speed sensing means are provided for sensing vehicle speed and for providing a vehicle speed signal indicative thereof. Means are provided for modifying the motor control signal in response to the motor speed and the vehicle speed signal so as to provide damping as a non-linear function of both the sensed motor speed and the vehicle speed.

It is desirable to provide yaw rate control in an electric assist steering system under a situation that the vehicle speed signal is lost and the steering system is operating in an even quadrant mode, i.e., the steering input torque is not in the same direction as the steering output motion.

SUMMARY OF THE INVENTION

An electric assist steering system is provided having an arrangement for sensing loss of a vehicle speed signal.

In accordance with one embodiment of the present invention, the steering system provides yaw rate damping that varies as a function of vehicle speed and steering motor speed. The system includes a vehicle speed sensor that provides a vehicle speed signal. A determination is made as to whether a loss of the vehicle speed signal has occurred. Damping of the electric assist steering system is controlled in response to the sensed vehicle speed and, when a vehicle speed signal loss occurs, in accordance with a predetermined damping state.

In accordance with a preferred embodiment of the present invention, an electric assist steering system comprises means for sensing vehicle speed and for providing a vehicle speed signal, and means for determining the occurrence of a loss of the vehicle speed signal and for providing a signal indicative thereof. The apparatus further includes means for controlling damping of the electric assist steering system in response to the vehicle speed signal and in response to a predetermined vehicle speed value when the means for sensing a loss provides the signal indicating loss of the vehicle speed signal.

In accordance with another embodiment, an electric assist steering system comprises torque sensor means for sensing applied steering torque and providing a steering torque signal in response thereto. Means provides a torque demand signal having a value functionally related to said applied steering torque. An electric assist motor is operatively connected to a steering member for, when energized, providing power assist steering. The apparatus further comprises means for providing a motor control signal in response to said torque demand signal. Motor speed sensor means senses speed of said electric assist motor and provides a motor speed signal indicative thereof. Vehicle speed sensor means senses speed of the vehicle and provides a vehicle speed signal indicative thereof. The apparatus further includes means for sensing a loss of said vehicle speed signal and for providing a signal indicative of such loss. Means are provided for controlling damping of the electric assist motor in response to the motor speed signal and the sensed vehicle speed and in response to a predetermined damping state when the means for sensing a vehicle speed signal loss indicates a loss of the vehicle speed signal.

In accordance with another aspect of the present invention, an apparatus is provided for detecting loss of a vehicle speed signal in an electric assist steering system having an electric assist motor comprising means for sensing vehicle speed and for providing a vehicle speed signal and means for determining if a rate of operation of said electric assist motor is greater than a predetermined value for a predetermined time period. The apparatus further comprises means for providing a warning indication when the determining means determines that the rate of operation of the electric assist motor is greater than a predetermined value for a predetermined time period and said sensing means does not provide a signal indicating vehicle speed greater than a predetermined value.

In accordance with another aspect of the present invention, a method is provided for controlling an electric assist steering system comprising the steps of sensing vehicle speed and providing a vehicle speed signal, determining the occurrence of a loss of the vehicle speed signal and providing a signal indicative thereof, and controlling damping of the electric assist steering system in response to the vehicle speed signal and in response to a predetermined damping state when the step of sensing a loss provides the signal indicating the loss of the vehicle speed signal. In accordance with a preferred embodiment, the damping is controlled in response to a predetermined speed value when the step of sensing a loss provides the signal indicating the loss of the vehicle speed signal.

In accordance with yet another aspect of the present invention, a method is provided for detecting loss of a vehicle speed signal in an electric assist steering system having an electric assist motor comprising the steps of sensing vehicle speed and providing a vehicle speed signal, determining if a rate of operation of the electric assist motor is greater than a predetermined value for a predetermined time period, and providing a warning indication when the step of determining determines that the rate of operation of the electric assist motor is greater than a predetermined value for a predetermined time period and the step of sensing does not provide a signal indicating vehicle speed greater than a predetermined value.

BRIEF DESCRIPTION OF THE DRAWINGS

Further features and advantages of the present invention will become apparent to those skilled in the art to which the present invention relates from reading the following description with reference to the accompanying drawings, in which.

DESCRIPTION OF PREFERRED EMBODIMENT

Figure 1:
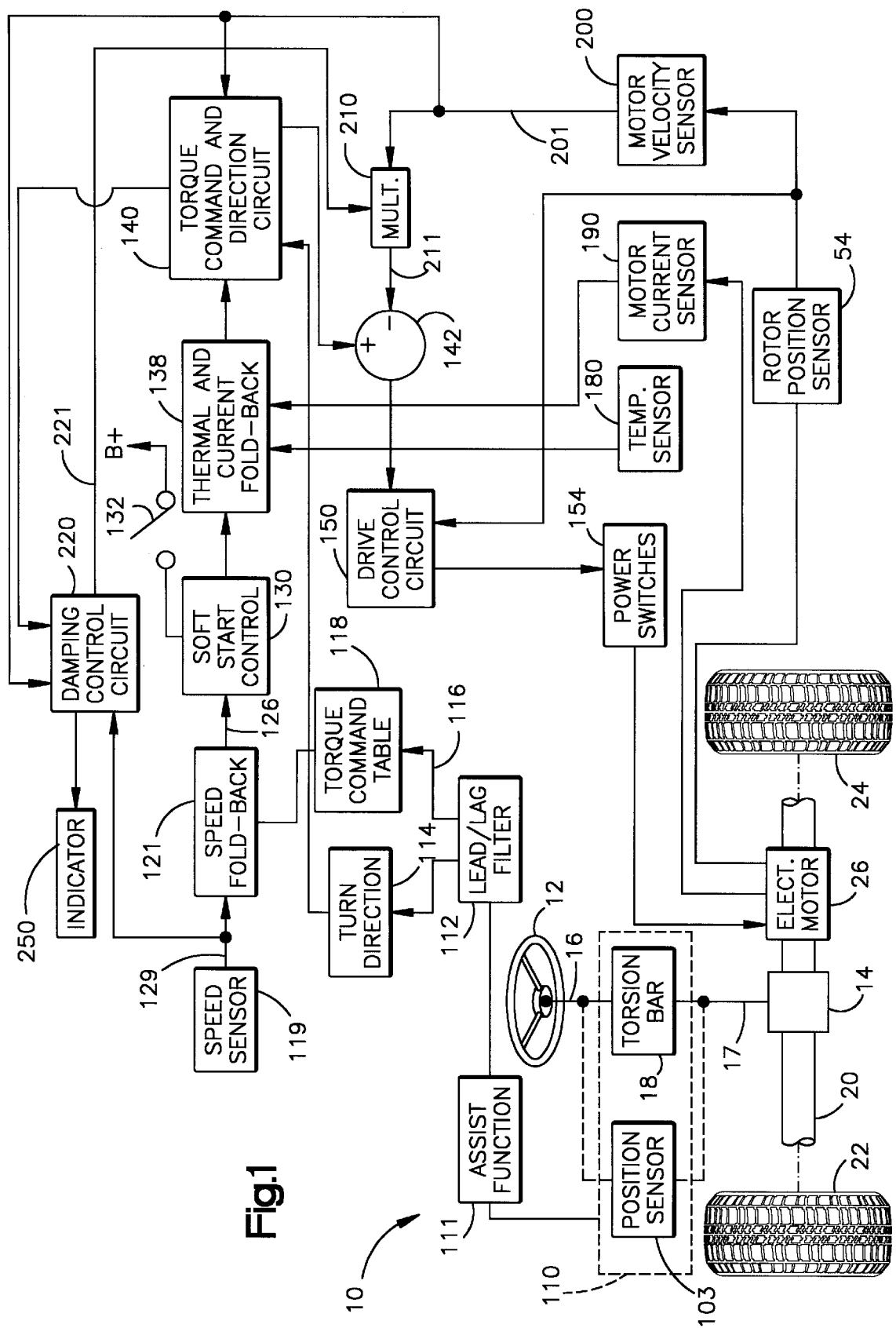
FIG. 1 is a schematic block diagram illustrating an electric assist steering system in accordance with the present invention.

Referring to FIG. 1, a power assist steering system 10 includes a steering wheel 12 operatively connected to a pinion gear 14. Specifically, the vehicle steering wheel 12 is connected to an input shaft 16 and the pinion gear 14 is connected to a pinion shaft 17. The input shaft 16 is operatively coupled to the pinion shaft 17 through a torsion bar 18. The torsion bar 18 twists in response to applied steering torque thereby permitting relative rotation between the input shaft 16 and the pinion shaft 17. Stops, of a type well known in the art, limit the amount of such relative rotation between the input and pinion shafts.

The pinion gear 14 has helical teeth which are meshingly engaged with straight cut teeth on a rack or linear steering member 20. The pinion gear in combination with the straight cut gear teeth on the rack member form a rack and pinion gear set. The rack is steerably coupled to the vehicle's steerable wheels 22, 24 with steering linkage in a known manner. When the steering wheel 12 is turned, the rack and pinion gear set converts the rotary motion of the steering wheel into linear motion of the rack 20, as is well known in the art. When the rack moves linearly, the steerable wheels 22, 24 pivot about their associated steering axis and the vehicle is steered.

An electric assist motor 26 is drivingly connected to the rack 20 through a ball-nut drive arrangement such as that disclosed in the above-mentioned Drutchas U.S. Pat. No. 4,415,054, now U.S. Reissue Patent No. 32,222, assigned to TRW Inc., and which is hereby fully incorporated herein by reference. When the electric motor 26 is energized, it provides power assist to the movement of the rack so as to aid in the rotation of the vehicle steering wheel 12 by the vehicle operator. In accordance with a preferred embodiment of the present invention, the electric assist motor is a variable reluctance motor. A variable reluctance motor is desirable for use in an electric assist steering system because of its small size, low friction, and its high torque-to-inertia ratio. U.S. Pat. No. 5,257,828, to Miller et al., and assigned to TRW Inc., the specification of which is hereby fully incorporated herein by reference, disclosed a control arrangement for a variable reluctance motor in an electric assist steering system.

A rotor position sensor 54 is operatively connected between the rotor and the stator of the motor 26. The function of the rotor position sensor 54 is to provide an electrical signal indicative of the position of the rotor relative to the stator. The sensor 54 is also referred to herein as a motor position sensor. For proper operation of the variable reluctance motor, including direction of rotation and applied torque, it is necessary to know the position of the rotor relative to the stator.

In the preferred embodiment of the present invention, a physical rotor position sensor is provided. It is known in the art that the rotor position can be determined by means other than a physical position sensor. For example, it is possible to monitor the current through the de-energized stator coils and, based upon the sensed current, the rotor position is determined. A preferred rotor position sensor arrangement is fully described in U.S. patent application Ser. No. 08/329,206 to Persson et al., filed Oct. 26, 1994, entitled "Method and Apparatus for Sensing Relative Position Between Two Relatively Rotatable Members Using Concentric Rings" and which is hereby fully incorporated herein by reference.

A position sensor 103 is operatively connected across the input shaft 16 and the pinion shaft 17 and provides an electrical signal having a value indicative of the relative rotational position between the input shaft 16 and the pinion shaft 17. The position sensor 103 in combination with the torsion bar 18 form a torque sensor 110. The output of the torque sensor 110 is indicative of the applied steering torque to the vehicle steering wheel 12 by the vehicle operator.

The output of the torque sensor 110 is connected to an assist function circuit 111 that provides a desired torque value as a function of applied steering torque measured by the torque sensor 110. This functional relationship may be any one of several possible relationships with the goal of improving steering feel. Some contemplated relationships include those disclosed in U.S. Pat. No. 5,568,389 to McLaughlin et al. entitled "Method and Apparatus For Controlling an Electric Assist Steering System" and U.S. Pat. No. 5,504,403 to McLaughlin entitled "Method and Apparatus For Controlling an Electric Assist Steering System Using an Adaptive Blending Torque Filter," both of which are hereby fully incorporated herein by reference.

The output of the assist function circuit 111 is connected to a lead/lag filter 112. The lead/lag filter 112 processes the torque signal and separates it into a turn direction signal 114 and a magnitude signal 116. In processing the torque signal, the lead/lag filter 112 amplifies the value of torque signal.

The torque magnitude value 116 is converted to a torque command signal preferably by use of a torque command look-up table 118 based upon the torque magnitude. Those skilled in the art will realize that filtering of the output of the torque sensor signal may be distributed differently about the torque command table than is specifically shown and described. For example, the output of the assist function circuit 111 may be directly connected to the table 118 and the filtering occurring at the output of the table.

A vehicle speed sensor 119 is operatively connected to the vehicle and has an output 129. Speed sensor 119 provides a signal, hereinafter referred to as "s", having a value indicative of the vehicle's speed. Output 129 is operatively connected to a speed fold-back circuit 121 and a damping control circuit 220. Those skilled in the art appreciate that a vehicle speed sensor includes a device connected to the vehicle wheels or to the vehicle transmission that generates pulses at a frequency functionally related to the sensed vehicle speed. The speed sensor 119 further includes circuitry that converts the pulse frequency into a signal having a value indicative of the vehicle speed.

The output 129 of speed sensor 119 and the output from the torque command table 118 are combined in speed fold-back circuit 121. As is well known in the art, the amount of power assist needed for a vehicle steering system decreases as vehicle speed increases. Therefore, to maintain a proper or desirable feel to steering maneuvers, it is desirable to decrease the amount of steering power assist as the vehicle speed increases. The output 126 of the speed fold-back circuit is a torque command signal that is "corrected" as a function of vehicle speed.

The output 126 of the speed fold-back circuit 121 is connected to a soft start control circuit 130. The soft start control circuit 130 is also operatively connected to the vehicle ignition switch 132 for detection of when the vehicle is first started. The purpose of the soft start control circuit is to prevent full assist from being provided to the vehicle when the vehicle is first being started. It is not uncommon for the vehicle operator to be applying torque to the steering wheel 12 with one hand while he is turning the ignition switch to the starting position. If full power assist were immediately available, the steering wheel would jerk in his hand. The soft start circuit prevents this unpleasant event from happening and simulates the operation of a hydraulic power assist steering system which does not provide full power assist until the vehicle motor is running at idle speed or above (as opposed to cranking speed).

The output of the soft start circuit 130, after an initial time delay to allow for starting of the vehicle, is the torque demand or request signal "corrected" for vehicle speed. The output of the soft start circuit 130 is connected to a thermal and current fold-back circuit 138. A system temperature sensor circuit 180 monitors temperature of the circuitry used to control the electric assist motor 26. A motor current sensor 190 monitors current through the motor 26 and outputs a signal to the thermal and current fold-back circuit 138 indicative of the sensed current through the motor 26. The thermal and current fold-back circuit 138 further modifies the torque request signal as a function of the sensed current through the motor and the sensed temperature of the control circuitry. The output of the fold-back circuit 138 is connected to the torque command and direction circuit 140. The steering direction signal 114 is also connected to the torque command and direction circuit 140. The circuit 140 recombines the torque direction signal with the torque request signal that has been "corrected" for (i) vehicle speed, (ii) soft start, (iii) sensed motor current, and (iv) sensed temperature of the control circuitry. The output of the torque command and direction circuit 140 is connected as one input of a summing circuit 142. An output of the torque command and direction circuit 140 is connected as one input of a damping control circuit 220.

The output of the summing circuit 142 is connected to the input of a drive control circuit 150. The output of the motor position sensor 54 is also connected to the drive control circuit 150. Based upon the torque command signal output from the summing circuit 142 and based upon the position of the motor's rotor, the drive control circuit 150 provides a motor control signal used to control energization of the electric assist motor 26 in terms of sequence and current applied to the motor's stator coils through a plurality of power switches 154.

The drive control circuit 150 is preferably a microcomputer. Commutation or drive pulses may need to be output to the stator windings at a rate faster than the motor position data can be processed from the sensor 54 to insure smooth operation of the variable reluctance motor. To solve this problem, the position of the rotor can be estimated at predetermined times between actual rotor position measurements based upon certain known conditions and certain assumptions. Rotor position estimation is described in an IEEE paper entitled "A Simple Motion Estimator For VR Motors" by W. D. Harris and J. H. Lang, IEEE Industry Applications Society Annual Meeting, October 1988 and in a paper entitled "A State Observer for Variable Reluctance Motors: Analysis and Experiments" by A Lumsdaine, J. H. Lang, and M. J. Balas, 19th ASILOMAR Conference on Circuits, Systems & Computers, Nov. 6–8, 1985, both papers being hereby fully incorporated herein by reference.

A preferred arrange for a drive control circuit and power switches is disclosed in U.S. patent application Ser. No. 08/710,742 to Beck entitled "Method and Apparatus For Controlling an Electric Assist Motor" and which is hereby fully incorporated herein by reference.

A motor velocity sensor 200 is connected to the rotor position sensor 54. The motor velocity sensor 200 determines velocity of the steering assist motor 26 by monitoring the change in the rotor position as a function of time. The sensor 200 provides an output signal 201, referred to herein as $W_m$, having both a velocity magnitude component and a direction of rotation component. The motor velocity sensor 200 output 201 is connected to (i) damping control circuit 220, (ii) one input of a multiplier circuit 210, and (iii) torque command and direction circuit 140.

Damping control circuit 220 has an output 221 which provides a damping control signal, hereinafter also referred to as $K_D$. The damping control signal $K_D$ has a value functionally related to the value of the sensed motor velocity and the value of the sensed vehicle speed. The output 221 of damping control circuit 220 is connected as a second input of multiplier circuit 210.

Multiplier circuit 210 has an output 211 and provides a retarding torque signal, hereinafter also referred to as $R_\tau$. Retarding torque signal $R_\tau$ is functionally related to damping control signal $K_D$ and motor velocity signal $W_m$. The relationships between $R_\tau$, $K_D$ and $W_m$ may be expressed by the following equation;

$$R_\tau = K_D \times W_m$$

The damping control signal $K_D$ may be expressed as $$K_D = [K_{d1}(s)] \times [K_{d2}(W_m)]$$

were s=vehicle speed, $W_m$=motor velocity, $K_{d1}(s)$ is the vehicle speed damping factor, and $K_{d2}(W_m)$ is the assist motor velocity damping factor. These last two damping factors may be expressed as $$K_{d1}(s) = A_1(s) + B_1$$

$$K_{d2}(W_m) = A_2(W_m) + B_2$$

$A_1$, $A_2$, $B_1$, and $B_2$ are constants that are stored in a look-up table. These values can be empirically determined for a particular vehicle platform to achieve a desired "steering feel." The retarding torque $R_\tau$ value output from the multiplier 210 is the negative input to the summing circuit 142.

Preferably, the system provides a non-linear function of retarding torque. A full description of a control arrangement for providing non-linear damping is set forth in U.S. patent application Ser. No. 08/331,962 to Joseph D. Miller filed Oct. 31, 1994 entitled "Method and Apparatus For Non-Linear Damping of an Electric Assist Steering System for Vehicle Yaw Rate Control" assigned to TRW Inc. and which is hereby fully incorporated herein by reference.

Basically, for a low vehicle speed and low motor velocity, the resultant damping term output from the multiplier 211 is low. As vehicle speed remains low and motor velocity increases, the resultant damping output value from the multiplier 211 increases. As both vehicle speed and motor velocity increase, the damping value increases in an increasing parabolic fashion.

When a vehicle is in a steering maneuver, i.e., the steering wheel and the steerable wheels are turned while the vehicle is traveling, road forces and caster of the steerable wheels tend to return the steerable wheels to a straight-ahead position. Another steerable wheel steering effect arises from tire wrap. Tire wrap is the effect of twisting of the tire rubber when the steerable wheel is turned while the vehicle is not moving. When the steering wheel is released, the steerable wheels move in a steering direction so as to untwist the rubber of the tires.

In an electric assist steering system, damping is the amount of retarding force which opposes the electric assist motor rotation. If the damping is equal to zero, there is no retarding torque applied to the electric assist motor. Without retarding torque applied to the electric assist motor, there is less resistance to turning the steerable wheels or returning the steerable wheels to the straight-ahead position after a turning maneuver. If the vehicle is traveling at a high rate of speed and the damping is zero, the vehicle may become unstable resulting in increasing yaw rate of the vehicle and "spinning-out."

The damping of the vehicle yaw by control of the electric assist steering is preferably functionally related to both the sensed vehicle speed and the sensed velocity of the power assist motor in a non-linear manner. As the vehicle speed increases, the damping value output from the circuit 220 increases. The output 201 from sensor circuit 200 is providing a signal value indicative of how fast the steerable wheels are turning in a turning maneuver or returning to the straight-ahead position after a turning maneuver. The faster the steerable wheels are turning or returning toward center, the greater the damping. Based on vehicle steering system geometry, other damping coefficient calibration may be done to provide a desired steering "feel." The amount of retarding torque $R_\tau$ applied to the assist motor may vary depending on the desired "steering feel" of the vehicle. For example, a different "steering feel" or retarding torque may be desired for a turning maneuver than the "steering feel" or retarding torque during a return of the steerable wheels to a straight-ahead position.

Figure 2:
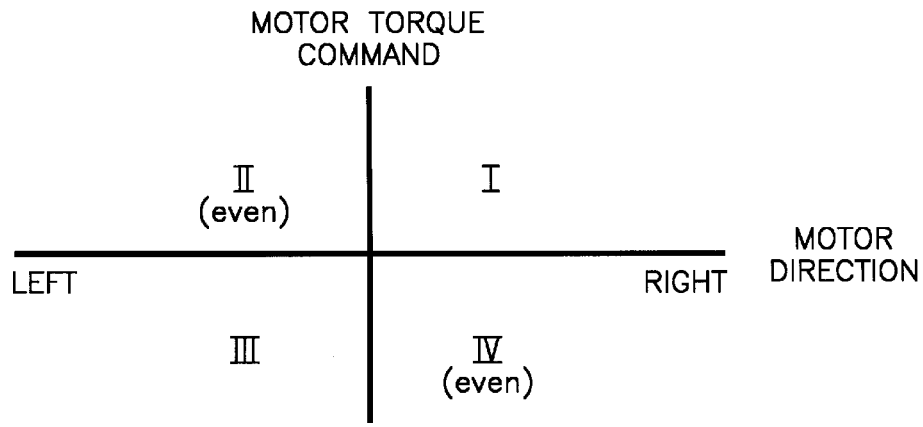
FIG. 2 is a four quadrant motor torque command versus motor direction plot illustrating the four quadrants of operation of the electric assist steering system of FIG. 1.

Referring to FIG. 2, a four quadrant plot illustrates motor torque command versus motor direction. The X-axis shows the motor direction. The Y-axis shows the direction of the motor torque command signal. Positive values for both motor direction and direction motor torque command is quadrant I, e.g., the motor is moving so as to turn the steerable wheels to the right and the motor torque command is to move the steerable wheels to the right. A negative (left) value for the motor direction and a positive value of motor torque command is quadrant II, e.g., the motor is moving so as to turn the steerable wheels to the left and the motor torque command is to move the steerable wheels to the right. Negative (left) values for both motor torque command and motor direction is quadrant III, e.g., the motor is moving so as to turn the steerable wheels to the left and the motor torque command is to move the steerable wheels to the left. A positive value for the motor direction and a negative (left) value motor torque command is quadrant IV, e.g., the motor is moving so as to turn the steerable wheels to the right and the motor torque command is to move the steerable wheels to the left. When the system is in quadrants II or IV, the steering system is said to be operating in the even steering quadrants. When the system is in quadrants I or III, the steering system is said to be operating in the odd steering quadrants.

Different values of retarding torque may be desired depending upon which quadrant the power assist steering system 10 is operating. For example, when the vehicle power assist steering system 10 is operating in quadrants I and III, lower damping may be desired. This is because damping is a retarding torque which decreases the assist provided by the electric assist motor. Greater assist is desired during a turning maneuver than during a return of the steerable wheels to a straight-ahead position. When the power assist steering system 10 is operating in quadrants II and IV, indicating a return of the steerable wheels to a straight-ahead position, higher damping may be desired. This is because the retarding torque during even quadrant operation stabilizes yaw rate as described above.

Also, different levels of retarding torque may be obtained by providing more than one look-up table. A first table may be provided having values for the constants $A_1$, $A_2$, $B_1$, and $B_2$ for when the power assist steering system is operating in quadrants I and III. A second table having higher values for the constants may be provided for when the system is operating in quadrants II and IV. A process for control of the damping values including selection of damping tables is fully described in the above-incorporated U.S. Miller patent application Ser. No. 08/331,962. The present invention provides a stabilized yaw rate control when the steering system is operating in quadrants II or IV and the vehicle speed signal 129 is lost due to, for example, a broken wire. In accordance with another embodiment of the present invention, upon detection of a vehicle speed signal loss, the control circuit 220 activates an indicator 250 to warn the vehicle operator. Once warned that a failure has occurred in the vehicle steering control system, the vehicle operator can have the vehicle repaired. Alternatively, the warning indication can be coupled with a memory and/or timing device to provide the vehicle OEM an indication as to the nature of the steering system failure and the time the vehicle was continued to be operated after the failure indication was provided to the vehicle operator.

Figure 3:
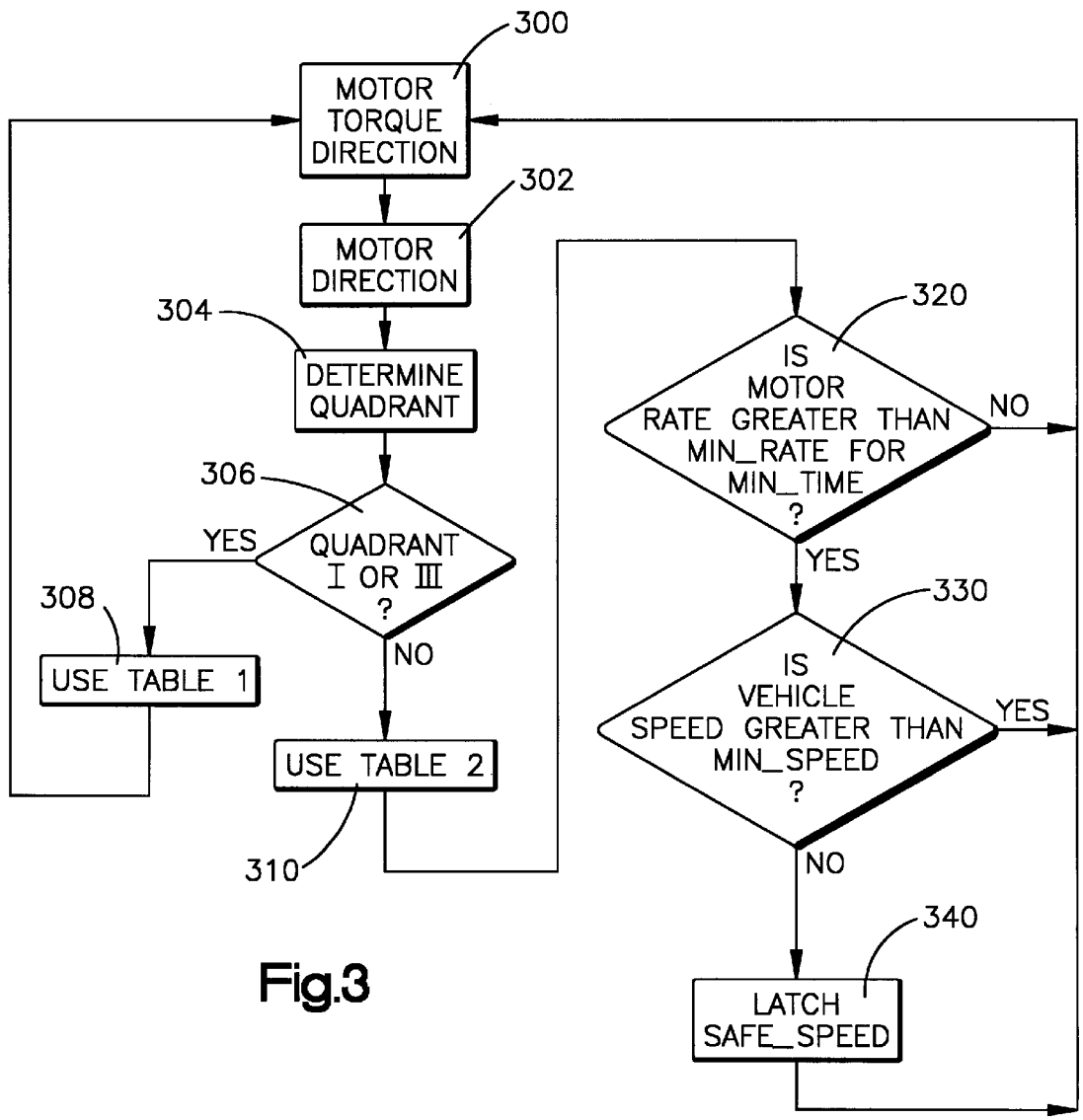
FIG. 3 is a flow chart illustrating a control process of the present invention for controlling the electric assist steering system of FIG. 1.

A process for selection of control tables, determination of the loss of the vehicle speed signal, and damping control when the vehicle speed signal 129 is lost is shown in FIG. 3. The process starts at step 300 where the motor torque command direction is determined. The process then proceeds to step 302 where direction of motor rotation is determined.

Motor velocity sensor 200, as mentioned above, provides a signal to damping control circuit 220 indicating, not only the motor velocity, but also the direction of rotation of motor 26 (velocity has both a magnitude component and a direction component). The direction of rotation of motor 26 is indicative of the direction of steering movement of the steerable wheels 22, 24. The process then proceeds to step 304.

In step 304, a determination is made in damping control circuit 220 as to which one of the four possible operating quadrants the power assist steering system 10 is operating. In step 306, a determination is made as to whether the power assist steering system is operating in quadrants I or III (i.e., the odd quadrants of operation) as opposed to operating in quadrants II or IV. If the determination in step 306 is affirmative (the system is operating in the odd quadrants), the process proceeds to step 308. In step 308, the first table of control values is selected and used to determine the values of the damping factors $K_{d1}(s)$, the vehicle speed damping factor, and $K_{d2}(W_m)$, the assist motor velocity damping factor. The process then returns to step 300.

If the determination in step 306 is negative, i.e. the power assist steering system is operating in either quadrant II or IV, the process proceeds to step 310. In step 310, the second table of values is selected to determine the values of the damping factors $K_{d1}(s)$, the vehicle speed damping factor, and $K_{d2}(W_m)$, the assist motor velocity damping factor. The process then proceeds to step 320.

In step 320, a determination is made as to whether the motor rate from signal 201 is greater that a predetermined minimum rate for a predetermined minimum time period. In accordance with one preferred embodiment of the present invention, the minimum motor rate is equal to 720 mechanical degrees per second which is approximately equal to a hand wheel (steering wheel 12) rate of 20 revolutions per minute. The predetermined minimum time period is equal to the tire wrap value divided by the motor rate. The tire wrap value is equal to the minimum tire wrap value plus the average unsigned motor torque command value for a period, initially set to one second, divided by the motor torque command value at 50 in-lbs from the zero speed assist table (i.e., maximum assist table) times the maximum tire wrap value. The minimum tire wrap value is equal to 20 hand wheel degrees which is equal to 120 motor mechanical degrees for a preferred steering system having a 6:1 ball-nut to pinion ratio.

As discussed above, tire wrap is the steering effect experienced by the steering system due to the tire (rubber) twisting when the vehicle is steered at park or low speed and the tire tries to untwist. The determination is made with regard to a minimum time so as to filter out tire wrap effects from the system's damping control.

The purpose of determining if the motor rate is greater than a minimum rate for a minimum time period is to provide an indication as to whether the vehicle is moving and should, therefore, have a vehicle speed signal present. If the vehicle is traveling in a normal manner, it can be assumed that certain steering inputs would be applied by the vehicle operator. If the steering inputs are, in fact, applied because of normal vehicle operation while traveling, the determination in step 320 would be affirmative. If the vehicle is stationary and no steering inputs are being applied, the determination in step 320 would be negative. If the determination in step 320 is negative, the process returns to step 300. If the determination in step 320 is affirmative, the process proceeds to step 330.

In step 330, a determination is made as to whether the vehicle sensed speed from signal 129 is greater than a predetermined minimum value. In accordance with one preferred embodiment of the present invention, the minimum vehicle speed for this determination is 3 kph. Recall that step 330 is entered under the assumption from step 320 that the vehicle is moving and there should, therefore, be a speed signal present. If the determination in step 330 is affirmative, i.e., the vehicle is moving at a speed greater than 3 kph, the process loops back to step 300. The vehicle speed used for damping control will be the measured vehicle speed.

If the determination in step 330 is negative, then it is assumed that the vehicle is moving but, for some reason, e.g., a broken wire or bad sensor, the speed signal is lost. Upon the occurrence of a lost speed signal, the process proceeds to step 340. In accordance with the present invention, when the vehicle speed signal is lost, damping is controlled in quadrants II and IV in accordance with a predetermined damping state. In accordance with a preferred embodiment of the present invention, a safe speed, i.e., a default speed value, is latched into memory in step 340. This safe speed or default speed value is then used for at least the a damping control for the even quadrant steering operation. The process then returns to step 300. Should the speed signal be reacquired, the sensed vehicle speed at that time will be used for the damping control instead of the default value. The default value for vehicle speed that is used upon the loss of the sensed vehicle speed signal, can be empirically determined for a vehicle platform of interest so as to provide a default steering feel. The present invention is not limited to damping in response to a predetermined speed value upon the loss of the vehicle speed signal. In accordance with the present invention, loss of the vehicle speed signal results in the occurrence of a predetermined damping state.

Also, if a speed signal is lost, the indicator 250 in the vehicle compartment can be actuated to inform the vehicle operator of a fault condition in the steering system. In addition to the warning indicator 250, other devices, such as memory devices (EEPROM, flash memory, etc.), can be used to record the time of occurrence of the fault condition or the lapsed time after activation of the warning indicator.

From the above description of a preferred embodiment of the invention, those skilled in the art will perceive improvements, changes, and modifications. Such improvements, changes, and modifications within the skill of the art are intended to be covered by the appended claims.

Having described a preferred embodiment of the invention, the following is claimed:

1. An apparatus for detecting loss of a vehicle speed signal in an electric assist steering system having an electric assist motor, said apparatus comprising:

means for sensing vehicle speed and for providing a vehicle speed signal;

means for determining if a rate of operation of said electric assist motor is greater than a predetermined value for a predetermined time period; and means for providing a warning indication when said determining means determines that the rate of operation of said electric assist motor is greater than a predetermined value for a predetermined time period and said sensing means does not provide a signal indicating vehicle speed greater than a predetermined value.

2. An electric assist steering system, comprising:

means for sensing vehicle speed and for providing a vehicle speed signal;

means for determining the occurrence of a loss of said vehicle speed signal and for providing a signal indicative thereof; and means for controlling damping of said electric assist steering system in response to said vehicle speed signal and, when said means for determining the occurrence of a loss provides said signal indicating loss of said vehicle speed signal, controlling damping in accordance with a predetermined damping value.

3. The apparatus of claim 2 wherein said predetermined damping value corresponds to a damping value at a predetermined vehicle speed value.

4. The apparatus of claim 2 wherein said steering system includes an electric assist motor and said means for determining the occurrence of a loss of said vehicle speed signal includes means for determining if a rate of operation of said electric assist motor is greater than a predetermined value for a predetermined time period.

5. An electric assist steering system, comprising:

torque sensor means for sensing applied steering torque and providing a steering torque signal in response thereto;

means for providing a torque demand signal having a value functionally related to said applied steering torque;

an electric assist motor operatively connected to a steering member for, when energized, providing power assist steering;

means for providing a motor control signal in response to said torque demand signal;

motor speed sensor means for sensing speed of said electric assist motor and for providing a motor speed signal indicative thereof;

vehicle speed sensor means for sensing speed of said vehicle and for providing a vehicle speed signal indicative thereof;

means for sensing a loss of said vehicle speed signal and for providing a signal indicative of such loss;

means for controlling damping of said electric assist motor in response to said motor speed signal and said sensed vehicle speed, and, when said means for sensing a vehicle speed signal loss indicates a loss of said vehicle speed signal, controlling damping in accordance with a predetermined damping value.

6. The apparatus of claim 5 wherein said predetermined damping value corresponds to a damping value at a predetermined vehicle speed value.

7. A method for controlling an electric assist steering system comprising the steps of:

sensing vehicle speed and providing a vehicle speed signal;

determining the occurrence of a loss of said vehicle speed signal and providing a signal indicative thereof; and controlling damping of said electric assist steering system in response to said vehicle speed signal and, when said step of sensing a loss provides said signal indicating loss of said vehicle speed signal, controlling damping in accordance with a predetermined damping value.

8. The method of claim 7 wherein said steering system includes an electric assist motor and said step of determining the occurrence of a loss of said vehicle speed signals includes determining if a rate of operation of said electric assist motor is greater than a predetermined value for a predetermined time period.

9. The method of claim 7 wherein said step of controlling damping in response to a predetermined damping value includes selecting a damping value that corresponds to a predetermined vehicle speed value.

10. A method for controlling an electric assist steering system comprising the steps of:

sensing applied steering torque and providing a steering torque signal in response thereto;

providing a torque demand signal having a value functionally related to said applied steering torque;

providing an electric assist motor operatively connected to a steering member for, when energized, providing power assist steering;

providing a motor control signal in response to said torque demand signal;

sensing speed of said electric assist motor and providing a motor speed signal indicative thereof;

sensing speed of said vehicle and providing a vehicle speed signal indicative thereof;

sensing a loss of said vehicle speed signal and providing a signal indicative of such loss;

controlling damping of said electric assist motor in response to said motor speed signal and said sensed vehicle speed;

controlling damping in response to a predetermined damping value when said step of sensing a vehicle speed signal loss indicates a loss of said vehicle speed signal.

11. The method of claim 10 wherein said step of controlling damping in response to a predetermined damping value includes selecting a damping value that corresponds to a predetermined vehicle speed value.

12. A method for detecting loss of a vehicle speed signal in an electric assist steering system having an electric assist motor, said method comprising the steps of:

sensing vehicle speed and providing a vehicle speed signal;

determining if a rate of operation of the electric assist motor is greater than a predetermined value for a predetermined time period; and providing a warning indication when said step of determining determines that the rate of operation of the electric assist motor is greater than a predetermined value for a predetermined time period and said step of sensing does not provide a signal indicating vehicle speed greater than a predetermined value.

* * * * *